US012770515B2

(12) United States Patent
Dumont et al.

(10) Patent No.: US 12,770,515 B2
(45) Date of Patent: Oct. 20, 2026

(54) DETECTING ACCIDENTS IN MOTORSPORTS BY USING ANOMALY DETECTION

(71) Applicant: MYLAPS B.V., Haarlem (NL)

(72) Inventors: Stan Dumont, Amersfoort (NL); Adriaan Klaas Verwoerd, Hoofddorp (NL)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 18/879,014

(22) PCT Filed: Jun. 28, 2023

(86) PCT No.: PCT/NL2023/050354
§ 371 (c)(1),
(2) Date: Dec. 26, 2024

(87) PCT Pub. No.: WO2024/005636
PCT Pub. Date: Jan. 4, 2024

(65) Prior Publication Data
US 2026/0004659 A1 Jan. 1, 2026

(30) Foreign Application Priority Data
Jun. 30, 2022 (NL) ...................................... 2032331

(51) Int. Cl.
*G08G 1/16* (2006.01)
*B60W 30/09* (2012.01)

(52) U.S. Cl.
CPC ............. *G08G 1/166* (2013.01); *B60W 30/09* (2013.01)

(58) Field of Classification Search
CPC ........ G08G 1/166; B60W 30/09; G06N 20/20
See application file for complete search history.

(56) References Cited

U.S. PATENT DOCUMENTS

2022/0170761 A1* 6/2022 Mubarek ................ G01C 21/30
2022/0172614 A1* 6/2022 Beaurepaire ....... G01C 21/3811

FOREIGN PATENT DOCUMENTS

WO WO-2019224712 A1 * 11/2019 ............. G06N 3/044
WO WO-2021066784 A1 * 4/2021 ............. G08G 1/052

OTHER PUBLICATIONS

Hariri et al. "Extended Isolation Forest", IEEE Transactions on Knowledge and Data Engineering, Apr. 4, 2021, pp. 1479-1489, vol. 33, No. 4.

(Continued)

*Primary Examiner* — Russell Frejd
(74) *Attorney, Agent, or Firm* — Samuel M. Korte; Kathleen D. Fitterling

(57) ABSTRACT

A system for detecting accidents in motorsports is configured to obtain measurement data from measurement units incorporated in or attached to a plurality of vehicles. The measurement data comprises data points. Each of the data points comprises a value for each of multiple variables. The system is configured to perform an anomaly detection algorithm on these data points. The anomaly detection algorithm is an improvement of the extended isolation forest algorithm in which a remaining data point is assigned to a first or second subtree based on which side of a hyperplane it lies. Each coordinate value of an intercept point of the hyperplane is determined by selecting a variable corresponding to the coordinate, determining an interval where a distance between values of the variable of consecutive data points of the remaining data points is maximal, and selecting a value for the coordinate on the interval.

12 Claims, 5 Drawing Sheets

(56) References Cited

OTHER PUBLICATIONS

Lesouple et al. "Generalized Isolation Forest for Anomaly Detection", Pattern Recognition Letters, Sep. 2021, pp. 109-119, vol. 149.
Liu et al. "Isolation Forest", IEEE International Conference on Data Mining, Dec. 2008, pp. 413-422.
Yudin et al. "Embedded Online Machine Learning", 2021 International Conference Engineering and Telecommunication, Nov. 24, 2021, 5 pages.
International Search Report and Written Opinion in corresponding International Application Ser. No. PCT/NL2023/050354 dated Oct. 5, 2023.

* cited by examiner

DETECTING ACCIDENTS IN MOTORSPORTS BY USING ANOMALY DETECTION

CROSS-REFERENCE TO RELATED APPLICATION(S)

This Application is a 371 National Stage Application of International Application No. PCT/NL2023/050354, filed Jun. 28, 2023 and published as WO 2024/005636 A1 on Janu. 4, 2024, and further claims priority to Netherlands Application Ser. No. 2032331, filed Jun. 30, 2022.

FIELD OF THE INVENTION

The invention relates to a system for detecting accidents in motorsports.

The invention further relates to a method of detecting accidents in motorsports.

The invention also relates to a computer program product enabling a system to perform such a method.

BACKGROUND OF THE INVENTION

Motor racing is a dangerous sport. Therefore, motorsports' governing bodies strive to make racing as safe as possible. Recent innovations and new technologies make the sport safer to a great extent. However, all these safety improvements do not make the sport risk-free. It is not uncommon that a driver is involved in a hefty accident and becomes seriously injured.

Racing vehicles and tracks are designed such that during a crash, drivers should be safe. A key safety moment is straight after an accident, when both the crashed drivers and the oncoming drivers are in danger. Crashed vehicles are often standing still on the racetrack. An oncoming driver could collide with such a stranded vehicle. Huge speed differences and unexpected impact angles increase the probability of serious injury. Most races are supervised by marshals. If they spot an accident, they wave with a yellow flag. This flag warns oncoming drivers that there is a dangerous situation ahead. Unfortunately, there is a delay between the accident and when the marshal begins waving. Moreover, tracks are not always equipped with a sufficient number of marshals.

Anomalies are points or patterns in data that do not conform to expected behavior. Anomaly detection is a field of research in which methods to classify anomalies are analyzed and developed. Anomaly detection has particular complexities compared to other classification problems. The characteristics of an anomaly are usually unknown, such as frequency and data structure. Also, anomalies can differ significantly between each other; anomaly classes can be heterogeneous. Lastly, anomalies are rare and consequently are part of an imbalanced dataset.

Anomaly detection started as a statistical significance tests to control data quality. Currently, anomaly detection has a wider range of applications, such as fraud detection in financial transactions, fault detection in manufacturing, intrusion detection in a computer network, monitoring sensor readings in an aircraft and spotting medical problems in health data.

The Isolation forest algorithm is an example of an anomaly detection algorithm. The isolation forest algorithm is an adaptation of the random forest algorithm. Isolation forest uses the step-wise partition method of random forest. Random partitions are made until all data points are isolated. The main idea is that anomalies are easier to isolate and therefore require fewer partitions. The Isolation forest algorithm is described in "Isolation forest" by Liu, F. T., Ting, K. M., and Zhou, Z.-H, published in eighth IEEE international conference on data mining (2008), pages 413-422.

The extended isolation forest algorithm is an improvement over the isolation forest algorithm. The extended isolation forest algorithm is described in "Extended isolation forest" by Hariri, S., Kind, M. C., and Brunner, R. J., published in IEEE Transactions on Knowledge and Data Engineering (2019), 33(4): 1479-1489. Hariri et al found that splitting a multidimensional dataset using the isolation forest algorithm causes a bias. Isolation forest splits the dataset using only one variable. A combination of partitions might create a cluster where there are a lot of partitions, but there are no data points.

Hariri et al proposed the extended isolation forest algorithm as a solution to this problem. Instead of splitting the dataset using a single variable, they split the dataset using a random hyperplane. In the standard isolation forest algorithm, the splitting process requires two pieces of information: a random variable and a random value within the range of this variable. In the extended isolation forest algorithm, the splitting process still requires two pieces of information: a random slope (vector) and a random intercept (point) for the split which is chosen from the range of available values of the training data. For every split, there is a different random hyperplane.

SUMMARY OF THE INVENTION

It is a first objective of the invention to provide a system, which uses anomaly detection to detect accidents in motorsports.

It is a second objective of the invention to provide a method, which uses anomaly detection to detect accidents in motorsports.

In a first aspect of the invention, a system for detecting accidents in motorsports comprises at least one processor configured to obtain measurement data from measurement units incorporated in or attached to a plurality of vehicles, the measurement data comprising a plurality of data points, each of the plurality of data points comprising a value for each of a plurality of variables, and to recursively partition the plurality of data points into a set of binary trees by determining a plurality of random subsets of the plurality of data points and building a binary tree for each respective subset of the plurality of random subsets, the data points of the respective subset being included as external nodes in a respective binary tree corresponding to the respective subset, each of the binary trees further including internal nodes, each of the internal nodes having a first subtree and a second subtree.

Each remaining data point of a set of remaining data points of the respective subset is assigned to the first subtree or the second subtree based on which side of a hyperplane the remaining data point lies, the hyperplane being a hyperplane in an N-dimensional representation of the plurality of data points, each of the N dimensions corresponding to one of the plurality of variables, a slope of the hyperplane being randomly selected and each intercept of the hyperplane being determined by selecting a variable corresponding to a respective intercept, determining an interval where a distance between values of the variable of consecutive data points of the remaining data points is maximal, and selecting a value for the intercept on the interval (e.g. randomly).

The at least one processor is further configured to determine an average tree depth of the set of binary trees, determine, for each respective data point of the plurality of data points, a path length between an external node of a binary tree of the set of binary trees and a root node of the binary tree, the external node being associated with the respective data point, determine, for each respective data point, an anomaly score based on the path length determined for the respective data point and further based on the average tree depth, detect, based on the anomaly scores, whether any of the plurality of data points corresponds to an anomaly, and generate an output signal reflecting a detected accident based on the detected anomalies.

There are situations where an oncoming driver is not warned on time and crashes into a stranded vehicle. A system that detects accidents and immediately warns oncoming drivers will reduce this risk. The task of a racing driver is to drive as fast as possible within the limits of the vehicle. An accident usually occurs when a driver goes over the limit of the vehicle, which is also dependent on other variables than the car itself, such as the track and weather conditions. Going over the limit is frequently detectable as an anomaly in the measurement data obtained from the measurement units incorporated in or attached to the vehicles. By using anomaly detection to detect accidents in motorsports (in real-time), motorsports safety may be improved.

By using a new version of the extended isolation forest algorithm, which will be referred to as distance-based extended isolation forest algorithm in this specification, accidents may be detected accurately and in real-time. The distance-based extended isolation forest algorithm was compared with other real-time unsupervised anomaly detection algorithms/models and turned out to be the most accurate approach with a detection rate of 1 and 0.538 false positives per hour.

The distance-based extended isolation forest approach not only deals with the rectangular splitting bias of the isolation forest approach but also makes use of distance-based splitting to allow use in real-time applications. The rectangular bias is mitigated by choosing a random slope vector for the hyperplane like in the extended isolation forest approach. Next, a (e.g. random) value is chosen for each variable separately on the interval where the distance between two consecutive points is maximal and used as coordinate value of the intercept point. Kernel density estimation is not used in order to limit the computational complexity of the algorithm and make it suitable for real-time applications.

A hyperplane is a subspace whose dimension is one less than that of its ambient space. The above-mentioned intercepts and intercept values are coordinate values of an intercept point of the hyperplane and are not points where the hyperplane intersects one of the N axes. Another way of writing that a slope of the hyperplane is randomly selected and each intercept of the hyperplane is determined by selecting a variable corresponding to a respective intercept, determining an interval where a distance between values of the variable of consecutive data points of the remaining data points is maximal, and selecting a value for the intercept on the interval is by writing that an N-dimensional slope vector of the hyperplane is randomly selected and each coordinate value of an N-dimensional intercept point of the hyperplane is determined by selecting a variable corresponding to a respective coordinate, determining an interval where a distance between values of the variable of consecutive data points of the remaining data points is maximal, and selecting a value for the respective coordinate on the interval. The combination of the intercept point and the slope vector defines the hyperplane.

The at least one processor may be configured to determine a quantity of the data points which correspond to an anomaly, determine whether the quantity exceeds a threshold, and generate the output signal reflecting a detected accident if the quantity is determined to exceed the threshold. For example, in time-series data, anomalies can occur longer than only one time-step. These anomalies are called collective anomalies. Collective anomalies are multiple point anomalies in a short period. By detecting accidents based on collective anomalies, a more accurate accident detection may be obtained.

The at least one processor may be configured to obtain the measurement data at a first moment, obtain further measurement data at a second moment from the measurement units, the further measurement data comprising a further plurality of data points, each of the further plurality of data points comprising a value for each of the plurality of variables, combine the plurality of data points and the further plurality of data points into a collection of data points, recursively partition the collection of data points into a set of new binary trees, and replace at least some binary trees of the set of binary trees with the set of new binary trees to obtain an updated set of binary trees.

The at least one processor may then further be configured to determine a new average tree depth of the updated set of binary trees, determine, for each of the data points of the collection, a path length between an external node of a binary tree of the updated set of binary trees and a root node of the binary tree, the external node being associated with the respective data point, determine, for each respective data point of the collection, a new anomaly score based on the path length determined for the respective data point and further based on the new average tree depth, detect, based on the new anomaly scores, whether any of the data points of the collection corresponds to a new anomaly, and generate an output signal reflecting a detected accident based on the detected new anomalies. This may be used to help prevent false positives due to concept drift. A data point may be considered to correspond to a new anomaly rather than an old anomaly if the data point is included in the further measurement data.

The at least one processor may be configured to randomly select a plurality of binary trees from the set of binary trees, a quantity of the selected plurality of binary trees equaling a quantity of the set of new binary trees, and replace the selected plurality of binary trees with the set of new binary trees to obtain the updated set of binary trees. For example, 10% of the current set of binary trees may be replaced with new binary trees as a tradeoff between quick adaptation and sensitivity to noise.

The at least one processor may be configured to create a new collection of data points and recursively partition the new collection of data points into a new set of new binary trees every fixed time interval. The fixed time interval may be between 5 and 15 minutes, for example. Alternatively, a variable interval may be used, for example. This process is preferably repeated during an entire race.

The at least one processor may be configured to determine a quantity of the collection of data points which correspond to a new anomaly or correspond to an anomaly detected at most a maximum amount of time ago, determine whether the quantity exceeds a threshold, and generate the output signal reflecting a detected accident if the quantity is determined to exceed the threshold. By detecting accidents based on collective anomalies, a more accurate accident detection may be obtained. Neglecting the time structure of time-series data would lead to a loss of information, With the original scoring method of the isolation forest algorithm, it is difficult to detect collective anomalies. Instead of classifying a point using a single anomaly score s(x, n), a set of points is classified as anomalous if each point of the set of points exceeds an anomaly score threshold in a short time period and the set of points comprises at least a predetermined minimum number of points.

The at least one processor may be configured to generate the output signal by transmitting a control signal to a display device to display a warning to one or more drivers of one or more vehicles. This makes it possible for drivers to quickly see when they need to pay more attention and/or decrease speed.

The at least one processor may be configured to generate the output signal by transmitting a control signal to one or more vehicles to activate a steering-assist function and/or a brake-assist function in the one or more vehicles to assist the one or more drivers of the one or more vehicles to avoid the accident. Normally, drivers prefer or must race without certain driver assistance functions. However, if an accident has been detected, by activating a steering-assist function and/or a brake-assist function, the driver may be able to avoid an accident. Driver assistance functions are less invasive than functions which intervene autonomously.

The at least one processor may be configured to generate the output signal by transmitting a control signal to one or more vehicles to activate a brake and/or adjust a steering of the one or more vehicles to avoid the accident. By intervening autonomously when an accident has been detected, the risk of colliding with a stranded vehicle may be reduced the most.

The system may further comprise the measurement units and the at least one processor may be configured to measure the measurement data via the measurement units.

In a second aspect of the invention, a method of detecting accidents in motorsports comprises obtaining measurement data from measurement units incorporated in or attached to a plurality of vehicles, the measurement data comprising a plurality of data points, each of the plurality of data points comprising a value for each of a plurality of variables, and further comprises recursively partitioning the plurality of data points into a set of binary trees by determining a plurality of random subsets of the plurality of data points and building a binary tree for each respective subset of the plurality of random subsets, the data points of the respective subset being included as external nodes in a respective binary tree corresponding to the respective subset, each of the binary trees further including internal nodes, each of the internal nodes having a first subtree and a second subtree.

Each remaining data point of a set of remaining data points of the respective subset is assigned to the first subtree or the second subtree based on which side of a hyperplane the remaining data point lies, the hyperplane being a hyperplane in an N-dimensional representation of the plurality of data points, each of the N dimensions corresponding to one of the plurality of variables, a slope of the hyperplane being randomly selected and each intercept of the hyperplane being determined by selecting a variable corresponding to a respective intercept, determining an interval where a distance between values of the variable of consecutive data points of the remaining data points is maximal, and selecting a value for the intercept on the interval.

The method further comprises determining an average tree depth of the set of binary trees, determining, for each respective data point of the plurality of data points, a path length between an external node of a binary tree of the set of binary trees and a root node of the binary tree, the external node being associated with the respective data point, determining, for each respective data point, an anomaly score based on the path length determined for the respective data point and further based on the average tree depth, detecting, based on the anomaly scores, whether any of the plurality of data points corresponds to an anomaly, and generating an output signal reflecting a detected accident based on the detected anomalies. The method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for detecting accidents in motorsports.

The executable operations comprise obtaining measurement data from measurement units incorporated in or attached to a plurality of vehicles, the measurement data comprising a plurality of data points, each of the plurality of data points comprising a value for each of a plurality of variables, and further comprise recursively partitioning the plurality of data points into a set of binary trees by determining a plurality of random subsets of the plurality of data points and building a binary tree for each respective subset of the plurality of random subsets, the data points of the respective subset being included as external nodes in a respective binary tree corresponding to the respective subset, each of the binary trees further including internal nodes, each of the internal nodes having a first subtree and a second subtree.

Each remaining data point of a set of remaining data points of the respective subset is assigned to the first subtree or the second subtree based on which side of a hyperplane the remaining data point lies, the hyperplane being a hyperplane in an N-dimensional representation of the plurality of data points, each of the N dimensions corresponding to one of the plurality of variables, a slope of the hyperplane being randomly selected and each intercept of the hyperplane being determined by selecting a variable corresponding to a respective intercept, determining an interval where a distance between values of the variable of consecutive data points of the remaining data points is maximal, and selecting a value for the intercept on the interval.

The executable operations further comprise determining an average tree depth of the set of binary trees, determining, for each respective data point of the plurality of data points, a path length between an external node of a binary tree of the set of binary trees and a root node of the binary tree, the external node being associated with the respective data point, determining, for each respective data point, an anomaly score based on the path length determined for the respective data point and further based on the average tree depth, detecting, based on the anomaly scores, whether any of the plurality of data points corresponds to an anomaly, and generating an output signal reflecting a detected accident based on the detected anomalies.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
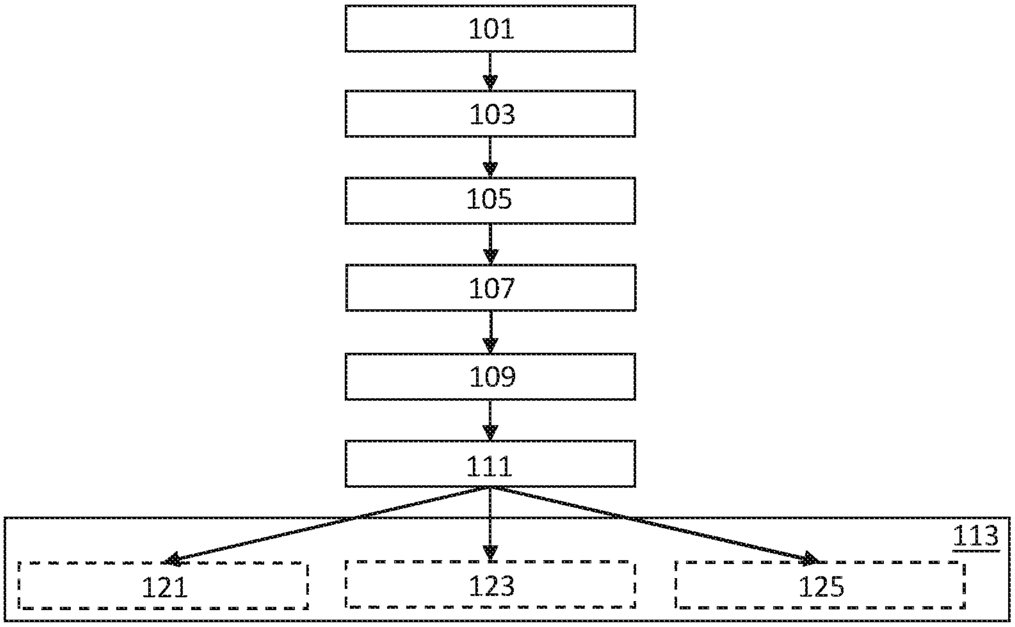
FIG. 1 is a flow diagram of a first embodiment of the method.

A first embodiment of the method of detecting accidents in motorsports is shown in FIG. 1. The method may be performed by the computer 1 of FIG. 8, for example. A step 101 comprises obtaining measurement data from measurement units incorporated in or attached to a plurality of vehicles. The measurement data comprise a plurality of data points. Each of the plurality of data points comprise a value for each of a plurality of variables. The measurement units may be inertial measurement units (IMUs), for example. IMUs generate data such as acceleration, velocity and orientation of the vehicle. IMUs are the most common method to accurately measure a moving object.

A step 103 comprises recursively partitioning the plurality of data points obtained in step 101 into a set of binary trees by determining a plurality of random subsets of the plurality of data points and building a binary tree for each respective subset of the plurality of random subsets. The data points of the respective subset are included as external nodes in a respective binary tree corresponding to the respective subset. Each of the binary trees further include internal nodes. Each of the internal nodes have a first subtree and a second subtree. This recursive portioning is part of each isolated forest algorithm.

As defined in the extended isolation forest approach, each remaining data point of a set of remaining data points of the respective subset is assigned to the first subtree or the second subtree based on which side of a hyperplane the remaining data point lies. The hyperplane is a hyperplane in an N-dimensional representation of the plurality of data points. A hyperplane is a subspace whose dimension is one less than that of its ambient space. For example, if a space is 3-dimensional then its hyperplanes are the 2-dimensional planes, while if the space is 2-dimensional, its hyperplanes are the 1-dimensional lines. Each of the N dimensions corresponds to one of the plurality of variables A slope, i.e. an N-dimensional slope vector, of the hyperplane is randomly selected.

In the conventional isolated forest algorithm, the intercepts, i.e. the coordinate values of the N-dimensional intercept point of the hyperplane, would be selected randomly in the range of the remaining data points. As an improvement over the extended isolation forest algorithm, each intercept of the hyperplane, i.e. each coordinate value of the intercept point of the hyperplane, is determined in step 103 by selecting a variable corresponding to a respective intercept/coordinate, determining an interval where a distance between values of the variable of consecutive data points of the remaining data points is maximal, and selecting a value for the respective intercept/coordinate on the interval, e.g. randomly.

For example, if the velocities (km/h) of the remaining data points comprise {50,150,200, 225, 230, 250, 260), then the interval where the distance between values of the variable of consecutive data points of the remaining data points is maximal is [50,150]. A value, e.g. 96, is then selected on this interval, e.g. randomly. This is repeated for the other variables. The hyperplane intersects the selected values.

A step 105 comprises determining an average tree depth of the set of binary trees determined in step 103. A step 107 comprises determining, for each respective data point of the plurality of data points obtained in step 101, a path length between an external node of a binary tree of the set of binary trees determined in step 103 and a root node of the binary tree. The external node is associated with the respective data point.

A step 109 comprises determining, for each respective data point obtained in step 109, an anomaly score based on the path length determined for the respective data point in step 105 and further based on the average tree depth determined in step 107. A step 111 comprises detecting, based on the anomaly scores determined in step 109, whether any of the plurality of data points corresponds to an anomaly.

A step 113 comprises generating an output signal reflecting a detected accident based on the anomalies detected in step 111. Step 113 may be implemented by one or more of steps 121, 123, and 125. Step 121 comprises transmitting a control signal to a display device to display a warning to one or more drivers of one or more vehicles. The display device may be placed next to a race track or in one of the vehicles. The control signal may be transmitted to multiple display devices. For example, the control signal may be transmitted to all display devices next to the race track or only to display devices in a relevant sector of the race track. Additionally or alternatively, the control signal may be transmitted to all vehicles or only to vehicles in or approaching a relevant sector.

Step 123 comprises transmitting a control signal to one or more vehicles to activate a steering-assist function and/or a brake-assist function in the one or more vehicles to assist the one or more drivers of the one or more vehicles to avoid the accident. Normally, drivers prefer or must race without certain driver assistance functions. However, if an accident has been detected, by activating a steering-assist function and/or a brake-assist function, the driver may be able to avoid an accident. The brake-assist function may make the vehicle brake harder when the driver uses the brake pedal. The steering-assist function may make the vehicle steer more easily and faster when the driver uses the steering wheel. Driver assistance functions are less invasive than functions which intervene autonomously.

Step 125 comprises transmitting a control signal to one or more vehicles to activate a brake and/or adjust a steering of the one or more vehicles to avoid the accident. By intervening autonomously when an accident has been detected, the risk of colliding with a stranded vehicle may be reduced the most. The location of the detected accident may be transmitted to the one or more vehicles, which then, based on its own location, decides when to activate the brake and/or adjust the steering.

In the specification, the term well-known term anomaly detection is used. In real-time applications, the term novelty detection is also used. Novelties are anomalies that are new points that differ from the already observed data. Anomaly detection and novelty detection are closely related to each other and usually use the same methodology. In this paper, the more widely used term anomaly detection refers to both.

Figure 2:
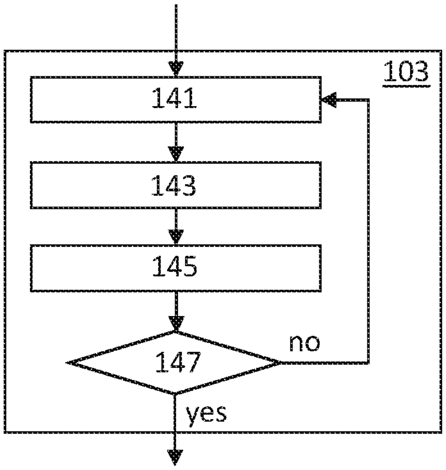
FIGS. 2 and 3 are flow diagrams of an implementation of step 103 in a second embodiment of the method.
Figure 3:
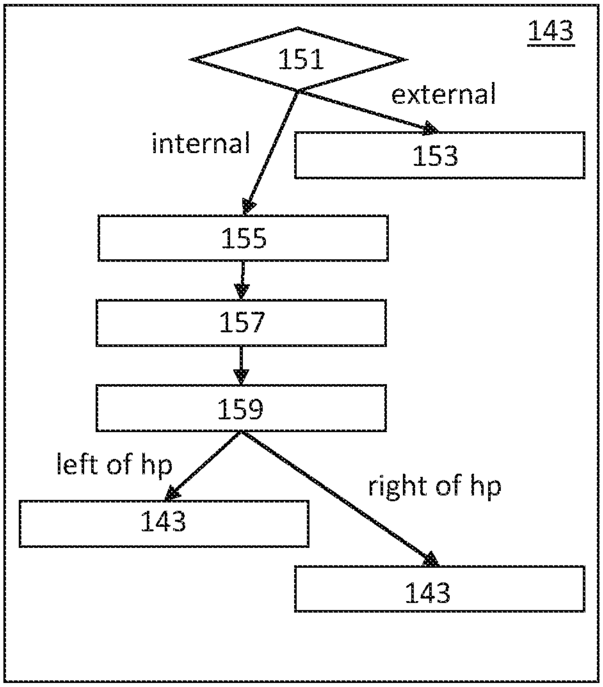

FIGS. 2 and 3 show an implementation of step 103 of FIG. 1 in a second embodiment of the method. In this implementation, the algorithms described in "Extended isolation forest" by Hariri, S., Kind, M. C., and Brunner, R. J., published in IEEE Transactions on Knowledge and Data Engineering (2019), 33(4): 1479-1489, are improved upon. Specifically, the algorithm iTree(X, e, 1) is improved upon. The algorithms described in this paper are itself an extension of the algorithms described in "Isolation forest" by Liu, F. T., Ting, K. M., and Zhou, Z.-H, published in eighth IEEE international conference on data mining (2008), pages 413-422.

FIG. 2 corresponds to the iForest algorithm described in the "Extended isolation forest" paper:

Algorithm 1 iForest (X, t, ψ)

```
Input: X - input data, t - number of trees, ψ - subsampling size
Output: a set of tiTrees
1:    Initialize Forests
2:    set height limit l = ceiling(log2 ψ)
3:    for i = 1 to t do
4:        X' ← sample(X, ψ)
5:        Forest ← Forest ∪iTree (X', 0, l)
6:    end for
```

Step 103 of FIG. 1 comprises recursively partitioning the plurality of data points obtained in step 101 into a set of binary trees. Step 103 is implemented by steps 141, 143, 145, and 147 in FIG. 2. Step 141 comprises determining a random subset of the plurality of data points. This step correspond to step 4 of the iForest algorithm shown above. The random subset may comprise 128 or 256 samples, for example.

Step 143 comprises building a binary tree for the subset determined in step 141. This done by performing the recursive iTree algorithm, see step 5 of the iForest algorithm shown above. The binary tree has external nodes and internal nodes. Each of the internal nodes has a first subtree and a second subtree. Step 145 comprises adding the new binary tree to the forest, see step 5 of the iForest algorithm shown above. Step 147 comprises checking whether the forest is complete, i.e. has reached a certain number of trees, e.g. 100. If so, step 105 is performed next. If not, steps 141-147 are repeated.

An implementation of step 143 is shown in FIG. 3. FIG. 3 corresponds to a modified version of the iTree algorithm described in the "Extended isolation forest" paper:

Algorithm 2 iTree(X, e, l)

```
Input: X - input data, e - current tree height, l - height limit
Output: an iTree
1:    if e ≥ l or |X| ≤ 1 then
2:        return exNode{Size ← |X|}
3:    else
4:        randomly select a normal vector n⃗ ∈ ℝ^|X|
          for the slope by drawing each
          coordinate value of n⃗ from a standard Gaussian distribution.
5:        select, separately for each variable of an intercept point p⃗
          ∈ ℝ^|X|, a random
          value on the interval where the distance between two
          consecutive points is
          maximal with respect to the variable in the range of X
6:        X_l ← filter(X, (X − p⃗) · n⃗ ≤ 0)
7:        X_r ← filter(X, (X − p⃗) · n⃗ > 0)
8:        return inNode{Left ← iTree (X_l, e + 1, l),
            Right ← iTree (X_r, e + 1, l),
            Normal ← n⃗
            Intercept ← p⃗}
9:    end if
```

Step 143 is implemented by steps 151, 153, 155, 157, 159 and 143 in FIG. 3. The performance of steps 143 in the implementation of step 143 reflects the recursive nature of step 143. Step 151 comprises evaluating the remaining data points. Specifically, step 151 comprises determining whether the binary tree currently being built has reached the height limit, which may be established, for example, in step 2 of the iForest algorithm shown above, or the set of remaining data points only contains one data point or less. If so, then step 153 is performed next. If not, step 155 is performed next. Step 151 correspond to step 1 of the iTree algorithm shown above In step 153, the one or more remaining data points are included as an external node in the current binary tree. If the set of remaining data points only contains one data point, the external node is associated with only this data point. If the height limit was reached, the external node may be associated with multiple data points. Step 153 corresponds to step 2 of the iTree algorithm shown above.

Step 155 comprises adding an internal node. Step 157 comprises randomly selecting the slope of the hyperplane. In the embodiment of FIG. 3, step 157 specifically comprises randomly selecting a normal vector $\vec{n} \in \mathbb{R}^{|X|}$ for the slope by drawing each coordinate value of $\vec{n}$ from a standard Gaussian distribution or in other words, drawing a random number for all N variables from the standard normal distribution. Step 157 corresponds to step 4 of the iTree algorithm shown above.

Step 159 comprises determining the intercepts, i.e. the coordinate values of the N-dimensional intercept point, of the hyperplane. Each intercept of the hyperplane, i.e. each coordinate value of the intercept point of the hyperplane, is determined by selecting a variable corresponding to a respective intercept/coordinate, determining an interval where a distance between values of the variable of consecutive data points of the remaining data points is maximal, and selecting a value for the respective intercept/coordinate on the interval. Step 159 corresponds to step 5 of the iTree algorithm shown above.

For example, if the velocities (km/h) of the remaining data points comprise {50,150,200, 225, 230, 250, 260), then the interval where the distance between values of the variable of consecutive data points of the remaining data points is maximal is [50,150]. A value, e.g. 96, is then selected on this interval, e.g. randomly. This is repeated for the other variables. The hyperplane intersects the selected values, i.e. the intercept point.

Figure 4:
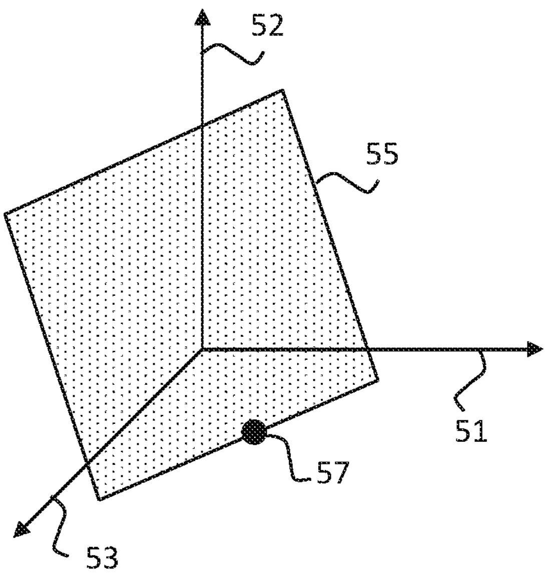
FIG. 4 shows an example of a hyperplane in three-dimensional space.

As described above, the hyperplane is a hyperplane in an N-dimensional representation of the plurality of data points. Each of the N dimensions corresponds to one of the plurality of variables. FIG. 4 shows an example of a hyperplane 55 in three-dimensional space. Each of the axes 51, 52, and 53 of the space/representation corresponds to one of the three dimensions and one of the three variables. The N coordinate values of an intercept point 57 are determined in step 159. In the example of FIG. 4, the value of the y coordinate of the intercept point 57 is zero for easier illustration. As the term intercept point implies, the intercept point 57 is a point on the hyperplane 55.

Step 5 of the iTree algorithm shown above is different from the corresponding step in the "Extended isolation forest" paper, which specified randomly selecting an intercept point $\vec{p} \in \mathbb{R}^{|X|}$ in the range of X or in other words, drawing from a uniform distribution over the range of values present at the split.

After step 159 has been performed, each remaining data point of the set of remaining data points is assigned to the left subtree or the right subtree based on which side of the hyperplane (hp) the remaining data point lies. Step 143 is performed twice: once for the remaining data points assigned to the left subtree and once for the remaining data point assigned to the right subtree. This corresponds to steps 6, 7, and 8 of the iTree algorithm shown above. Thus, the steps of FIG. 3 continue recursively until each data point is completely isolated or until a maximum depth (i.e. the height limit) is reached.

The "Extended isolation forest" paper also describes an implementation of steps 105, 107, and 109, and 111 of FIG. 1. Step 105 comprises determining an average tree depth of the set of binary trees determined in step 103, e.g. an average tree depth c(n). n is the number of data points in the data set. c(n) may be defined as c(n)=2H(n−1) or as c(n)=2H(n−1)−(2 (n−1)/n), where H(i) is the harmonic number and can be estimated by In (i)+0.5772156649 (Euler's constant).

Step 107 comprises determining, for each respective data point of the plurality of data points obtained in step 101, a path length between an external node of a binary tree of the set of binary trees determined in step 103 and a root node of the binary tree. Step 107 may comprise performing the PathLength algorithm described in the "Extended isolation forest" paper:

Algorithm 3 PathLength(x, T, e)

```
Input: x⃗ - an instance (data point), T - an iTree,
e - current path length; to be
initialized to zero when first called
Output: path length of x⃗
    if T is an external node then
        return e+c(T.size)
    end if
    n⃗ ← T.Normal
    p⃗ ← T.Intercept
    if (x⃗ − p⃗) · n⃗ ≤ 0 then
        return PathLength(x⃗, T.left, e + 1)
    else if (x⃗ − p⃗) · n⃗ > 0 then
    return PathLength(x⃗, T.right, e + 1)
      end if
```

The depth of data point x in tree t, calculated with PathLength ($\vec{x}$, T, 0), may be represented by $h_t(x)$. The PathLength algorithm may be performed for each tree in order to calculate E(h(x)). E(h(x)) is the mean value of the depths a single data point, x, reaches in all trees and may be defined as follows:

$$E[h(x)] = \frac{1}{t}\sum_{i=1}^{T} h_t(x)$$

Step 109 comprises determining, for each respective data point obtained in step 109, an anomaly score based on the path length determined for the respective data point in step 105 and further based on the average tree depth determined in step 107, e.g. by calculating s(x,n). s(x,n) is larger than 0 and smaller than or equal to 1 and may be defined as follows:

$$s(x, n) = 2^{-E(h(x))/c(n)}$$

Step 111 comprises detecting, based on the anomaly scores determined in step 109, whether any of the plurality of data points corresponds to an anomaly. The higher the anomaly score, the more likely the data point is an anomaly. For example, a data point may be identified as a (potential) anomaly when s≥0.6.

Advantages of the above-described anomaly detection model are that it can autonomously decides whether the data is anomalous or not, it runs in real-time (reduced computational burden), it can be trained with and without anomalies, and it is unsupervised (labelling data can be a time-consuming task, especially in time-series data with a high sampling rate). One reason why this anomaly detection model works well for detecting accidents in motorsports is that accidents in motorsport are unique to each other. What they have in common is that often during an accident some extreme values occur (sudden acceleration/deceleration, high rotational forces, unusual orientation of the vehicle). An accident can therefore be seen as an anomaly, at least theoretically.

The performance of the above-described new version of isolation forest (which makes use of multi-variable distance-based partitioning) has been compared with three known models: Deceleration threshold model (benchmark), Standard isolation forest, and LSTM network. The performance of the models was compared when used for accident detection in motorsports. In this comparison, IMU data generated by a radio-controlled car was used.

The performance of the models was assessed using two performance measures. The first one was the detection rate. This is defined as the number of correctly detected anomalies divided by the number of true anomalies. The second performance measure was false positives per hour. The distance-based extended isolation forest was the most accurate model with a detection rate of 1 and 0.538 false positives per hour. The benchmark model generated decent results, with a detection rate of 0.75 and 1.613 false positives per hour. The standard isolation forest had the same detection rate (1), but has more false positives per hour (2.688). The LSTM network performed even worse than the benchmark, with a detection rate of 0.688 and 2.688 false positives per hour. All results are when using a sample rate of 400. The sample rate is limited by the capabilities of the sensor.

Figure 5:
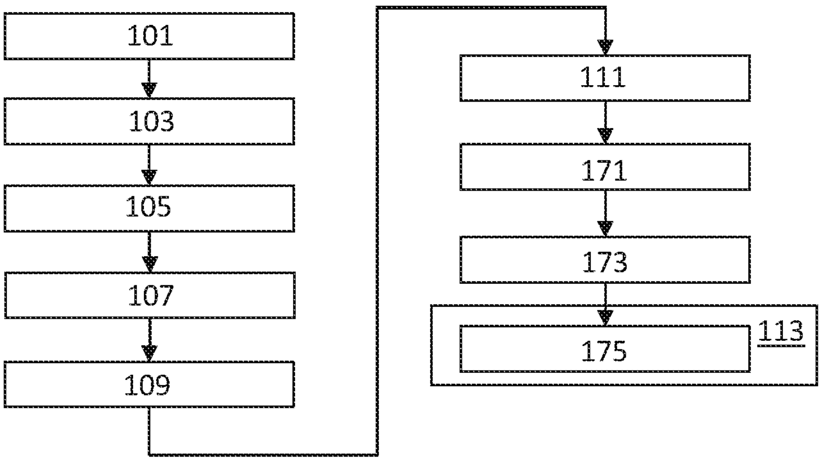
FIG. 5 is a flow diagram of a third embodiment of the method.

A third embodiment of the method of detecting accidents in motorsports is shown in FIG. 5. The third embodiment of FIG. 5 is an extension of the first embodiment of FIG. 1. In the third embodiment of FIG. 5, steps 171 and 173 are performed between steps 111 and 113 of FIG. 1 and step 113 of FIG. 1 is implemented by a step 175.

Step 171 comprises determining, based on the results on step 111, a quantity of the data points which correspond to an anomaly. Step 173 comprises determining whether the quantity determined in step 171 exceeds a threshold. Step 175 comprises generating the output signal reflecting a detected accident if the quantity was determined in step 173 to exceed the threshold.

Figure 6:
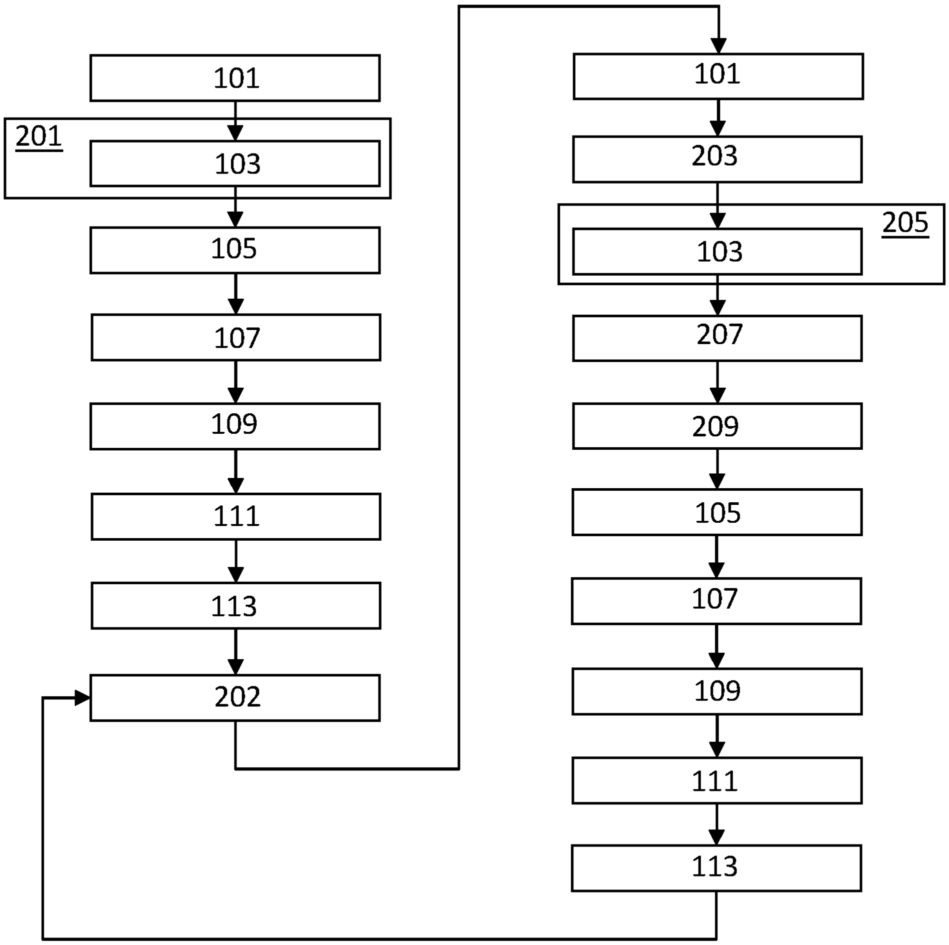
FIG. 6 is a flow diagram of a fourth embodiment of the method.

A fourth embodiment of the method of detecting accidents in motorsports is shown in FIG. 6. The fourth embodiment of FIG. 6 is an extension of the first embodiment of FIG. 1. In the fourth embodiment of FIG. 6, the measurement data is obtained in step 101 at a first moment. Steps 103-113 are then performed as described in relation to FIG. 1. Specifically, a first quantity of binary trees is generated in the first iteration of step 103. This first iteration of step 103 is shown as step 201 in FIG. 6.

A step 202 is performed after step 113. Step 202 comprises waiting a fixed time interval. The fixed time interval may be between 5 and 15 minutes, for example. The fixed time interval may be 10 minutes, for example. After the fixed time interval has passed, step 101 is repeated. In this next iteration of step 101, further measurement data is obtained at a second moment from the measurement units. The further measurement data comprises a further plurality of data points. Each of the further plurality of data points comprises a value for each of the plurality of variables.

A step 203 comprises combining the plurality of data points and the further plurality of data points into a collection of data points. Then, the next iteration of step 103 comprises recursively partitioning the collection of data points into a set of new binary trees. A second quantity of binary trees is generated in the next iteration of step 103. This next iteration of step 103 is shown as step 205 in FIG. 6.

In the embodiment of FIG. 6, the second quantity of binary trees generated in step 205 is smaller than the first quantity of binary trees generated in step 201. Therefore, a step 207 comprises randomly selecting a plurality of binary trees from the set of binary trees, e.g. from the binary trees generated in step 201 in the first iteration of step 205. The quantity of the old binary trees selected in step 207 equals the quantity of the new binary trees generated in step 205. A step 209 comprises replacing the plurality of binary trees selected in step 207 with the set of new binary trees generated in step 205 to obtain the updated set of binary trees.

In a less advantageous alternative embodiment, the second quantity of binary trees generated in step 205 is equal to the first quantity of binary trees generated in step 201. Step 207 can then be omitted and only the set of new binary trees is used in the next iterations of steps 105 to 113. In this alternative embodiment, all old binary trees are replaced with the new binary trees generated in step 205.

In the next iteration of step 105, a new average tree depth of the updated set of binary trees obtained in step 209 is determined. In the next iteration of step 107, for each of the data points of the collection obtained in step 203, a path length between an external node of a binary tree of the updated set of binary trees obtained in step 209 and a root node of the binary tree. The external node is associated with the respective data point.

In the next iteration of step 109, a new anomaly score is determined for each respective data point of the collection obtained in step 203 based on the path length determined for the respective data point in step 105 and further based on the new average tree depth determined in step 107. The next iteration of step 111 comprises detecting, based on the new anomaly scores determined in step 109, whether any of the data points of the collection corresponds to a new anomaly.

In the next iteration of step 113, an output signal reflecting a detected accident is generated based on (and independence on) the new anomalies detected in step 111. Step 202 is repeated after step 113. The result is that every fixed time interval, a new collection of data points is created and recursively partitioned into a new set of new binary trees.

In the embodiment of FIG. 6, to prevent false positives due to concept drift, a new set of binary trees is generated after each fixed time interval. The quantity $\#t_{new}$ of new binary trees is smaller than the quantity #t of binary trees in the collection. The quantity of old trees that is removed from the set of binary trees is the same as $\#t_{new}$ such that the size of the collection remains #t, e.g. 100.

The ability of the model to adapt is dependent on the value of $\#t_{new}$. A low $\#t_{new}$ makes the model adapt slowly to the new underlying data distribution. For example, if only 1% of the trees is replaced each time the model is retrained, the model takes 10 times longer to fully adapt to a new underlying data distribution than if 10% of the trees is replaced each time the model is retrained. This could harm the performance of the model, since during the period that the model has not yet adapted to the new underlying data distribution, the model is biased. However, a high $\#t_{new}$ can make the model sensitive to noise; if the model will be retrained on a batch of noisy data, the more trees are replaced, the larger the share of the model that is affected.

The embodiment of FIG. 6 tackles the problem of concept drift. Concept drift is the problem where the underlying distribution of the data changes in an unforeseen way. This can be an issue when the method is used in changing conditions. For example, if the model is trained on data generated in a dry race and the method is then used in wet conditions, the model and the real world would no longer match. The method of FIG. 6 may be used to ensure that the model adapts if the underlying data distribution changes.

Figure 7:
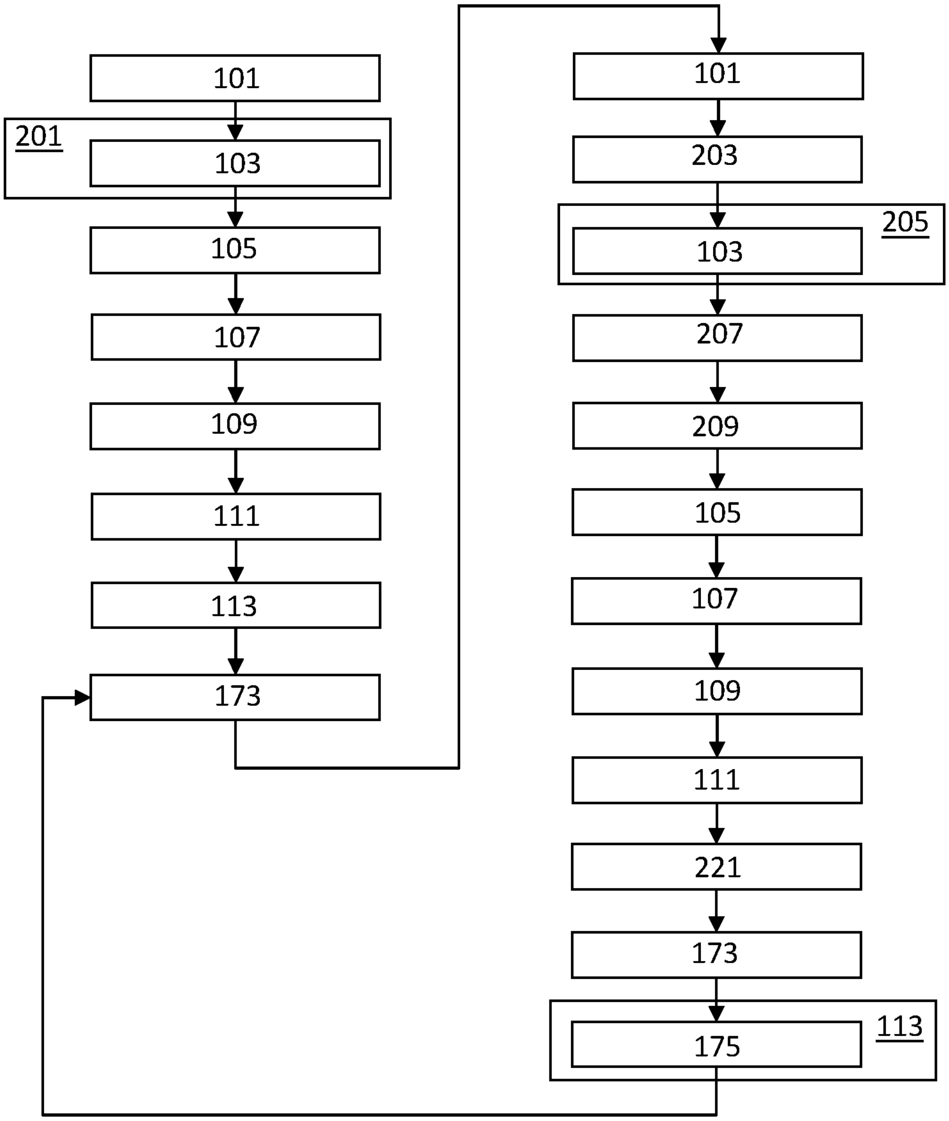
FIG. 7 is a flow diagram of a fifth embodiment of the method.

A fifth embodiment of the method of detecting accidents in motorsports is shown in FIG. 7. The fifth embodiment of FIG. 7 is an extension of the fourth embodiment of FIG. 6. In the fifth embodiment of FIG. 7, steps 221 and 173 are performed between steps 111 and 113 of FIG. 6 and step 113 of FIG. 6 is implemented by step 175.

Step 221 comprises determining a quantity of the collection of data points which correspond to a new anomaly or correspond to an anomaly detected at most a maximum amount of time ago. In time-series data, anomalies can occur longer than only one time-step. These anomalies are called collective anomalies. Collective anomalies are multiple point anomalies in a short period.

A collective anomaly may be detected if a new point anomaly is detected in the most recent iteration of step 111 and a sufficient number of corresponding point anomalies was detected at most a maximum amount of time ago in previous iterations of step 111. Step 173 comprises determining whether the quantity determined in step 221 exceeds a threshold. Step 175 comprises generating the output signal reflecting a detected accident if the quantity was determined in step 173 to exceed the threshold.

By detecting accidents based on collective anomalies, a more accurate accident detection may be obtained. Neglecting the time structure of time-series data would lead to a loss of information, With the original scoring method of the isolation forest algorithm, it is difficult to detect collective anomalies. Instead of classifying a point using a single anomaly score s(x, n), a set of points is classified as anomalous if each point of the set of points exceeds an anomaly score threshold in a short time period and the set of points comprises at least a predetermined minimum number of points.

Figure 8:
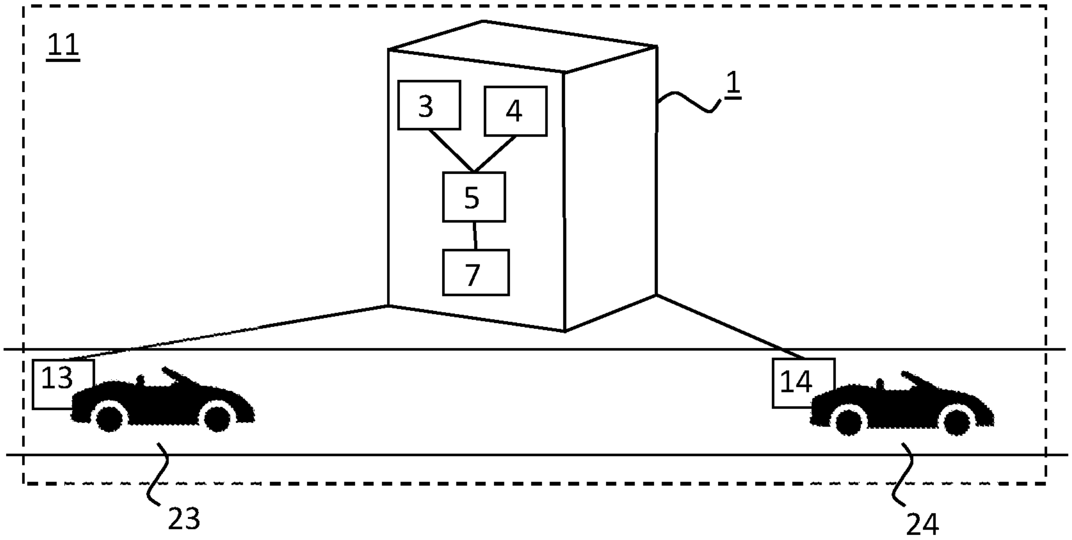
FIG. 8 is a block diagram of an embodiment of the system.

An embodiment of a system for detecting accidents in motorsports is shown in FIG. 8. In the embodiment of FIG. 8, the system comprises a computer 1. The computer 1 is part of a larger system 11 which further comprises measurement units 13 and 14. The measurement units 13 and 14 are incorporated in or attached to vehicles 23 and 24, respectively. Only two vehicles are shown in FIG. 8 for the sake of brevity. In practice, a race will normally involve more than two vehicles.

The computer 1 comprises a receiver 3, a transmitter 4, a processor 5, and a memory 7. The processor 5 may be configured to perform the methods as described in relation to FIGS. 1 to 3 and 5 to 7. In the embodiment of FIG. 8, the processor 5 is configured to measure the measurement data via the measurement units 13 and 14. The processor 5 is configured to obtain measurement data from the measurement units 13 and 14 (in real-time). The measurement data comprises a plurality of data points. Each of the plurality of data points comprises a value for each of a plurality of variables. The measurement units may be inertial measurement units (IMUs), for example. IMUs generate data such as acceleration, velocity and orientation of the vehicle. IMUs are the most common method to accurately measure a moving object.

The processor 5 is further configured to recursively partition the plurality of data points into a set of binary trees by determining a plurality of random subsets of the plurality of data points and building a binary tree for each respective subset of the plurality of random subsets. The data points of the respective subset are included as external nodes in a respective binary tree corresponding to the respective subset. Each of the binary trees further includes internal nodes. Each of the internal nodes have a first subtree and a second subtree.

Each remaining data point of a set of remaining data points of the respective subset is assigned to the first subtree or the second subtree based on which side of a hyperplane the remaining data point lies. The hyperplane is a hyperplane in an N-dimensional representation of the plurality of data points. Each of the N dimensions corresponds to one of the plurality of variables. A (slope) vector of the hyperplane is randomly selected. Each intercept of the hyperplane, i.e. each coordinate value of the intercept point of the hyperplane, is determined by selecting a variable corresponding to a respective intercept/coordinate, determining an interval where a distance between values of the variable of consecutive data points of the remaining data points is maximal, and selecting a value for the respective intercept/coordinate on the interval.

The processor 5 is further configured to determine an average tree depth of the set of binary trees, determine, for each respective data point of the plurality of data points, a path length between an associated external node of a binary tree of the set of binary trees and a root node of the binary tree, determine, for each respective data point, an anomaly score based on the path length determined for the respective data point and further based on the average tree depth, detect, based on the anomaly scores, whether any of the plurality of data points corresponds to an anomaly, and generate an output signal reflecting a detected accident based on the detected anomalies.

In the embodiment shown in FIG. 8, the computer 1 comprises one processor 5. In an alternative embodiment, the computer 1 comprises multiple processors. The processor may be a general-purpose processor, e.g., an Intel or an AMD processor, or an application-specific processor, for example. The processor may comprise multiple cores, for example. The processor may run a Unix-based or Windows operating system, for example. The memory 7 may comprise solid state memory, e.g., one or more Solid State Disks (SSDs) made out of Flash memory, or one or more hard disks, for example.

The receiver 3 and the transmitter 4 may use one or more communication technologies (wired or wireless) to communicate with the measurement units 13 and 14. The receiver and the transmitter may be combined in a transceiver. The computer 1 may comprise other components typical for a computer, e.g., a power supply.

Figure 9:
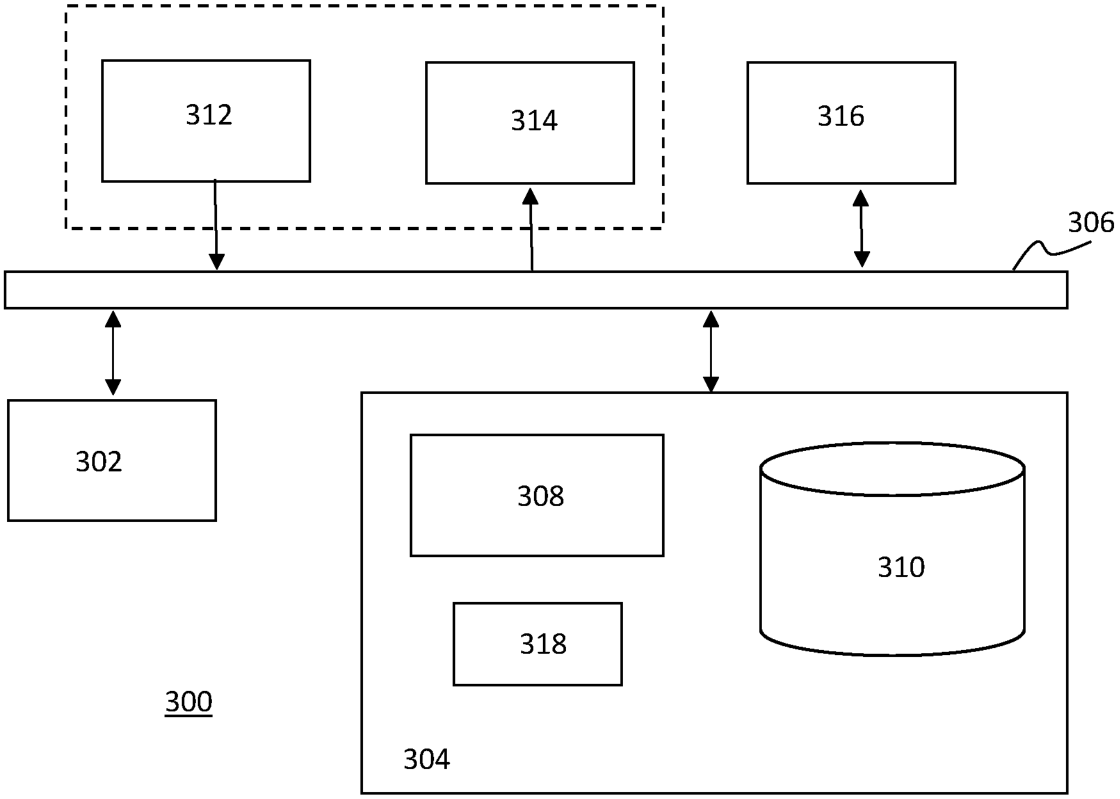
FIG. 9 is a block diagram of an exemplary data processing system for performing the steps of the method of the invention.

FIG. 9 depicts a block diagram illustrating an exemplary data processing system that may perform the method as described with reference to FIGS. 1-3 and 5-7.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, he one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for detecting accidents in motorsports, the system comprising at least one processor configured to:

obtain, in real-time, measurement data from measurement units incorporated in or attached to a plurality of vehicles, the measurement data comprising a plurality of data points, each of the plurality of data points comprising a value for each of a plurality of variables, recursively partition the plurality of data points into a set of binary trees by determining a plurality of random subsets of the plurality of data points and building a binary tree for each respective subset of the plurality of random subsets, the data points of the respective subset being included as external nodes in a respective binary tree corresponding to the respective subset, each of the binary trees further including internal nodes, each of the internal nodes having a first subtree and a second subtree, wherein each remaining data point of a set of remaining data points of the respective subset is assigned to the first subtree or the second subtree based on which side of a hyperplane the remaining data point lies, the hyperplane being a hyperplane in an N-dimensional representation of the plurality of data points, each of the N dimensions corresponding to one of the plurality of variables, an N-dimensional slope vector of the hyperplane being randomly selected and each coordinate value of an N-dimensional intercept point of the hyperplane being determined by selecting a variable corresponding to a respective coordinate, determining an interval where a distance between values of the variable of consecutive data points of the remaining data points is maximal, and selecting a value for the respective coordinate on the interval, determine an average tree depth of the set of binary trees, determine, for each respective data point of the plurality of data points, a path length between an external node of a binary tree of the set of binary trees and a root node of the binary tree, the external node being associated with the respective data point, determine, for each respective data point, an anomaly score based on the path length determined for the respective data point and further based on the average tree depth, detect, in real-time, based on the anomaly scores, whether any of the plurality of data points corresponds to an anomaly, and generate an output signal reflecting a detected accident based on detected anomalies, by transmitting a control signal to one or more vehicles to activate a steering-assist function and/or a brake-assist function in the one or more vehicles to assist one or more drivers of the one or more vehicles to avoid the detected accident.

2. The system as claimed in claim 1, wherein the at least one processor is configured to:

determine a quantity of the data points which correspond to an anomaly, determine whether the quantity exceeds a threshold, and generate the output signal reflecting a detected accident if the quantity is determined to exceed the threshold.

3. The system as claimed in claim 1, wherein the at least one processor is configured to:

obtain the measurement data in real-time at a first moment, obtain further measurement data in real-time at a second moment from the measurement units, the further measurement data comprising a further plurality of data points, each of the further plurality of data points comprising a value for each of the plurality of variables, combine the plurality of data points and the further plurality of data points into a collection of data points, recursively partition the collection of data points into a set of new binary trees, replace at least some binary trees of the set of binary trees with the set of new binary trees to obtain an updated set of binary trees, determine a new average tree depth of the updated set of binary trees, determine, for each of the data points of the collection, a path length between an external node of a binary tree of the updated set of binary trees and a root node of the binary tree, the external node being associated with the respective data point, determine, for each respective data point of the collection, a new anomaly score based on the path length determined for the respective data point and further based on the new average tree depth, detect, in real-time, based on the new anomaly scores, whether any of the data points of the collection corresponds to a new anomaly, and generate an output signal reflecting a detected accident based on the detected new anomalies.

4. The system as claimed in claim 3, wherein the at least one processor is configured to:

randomly select a plurality of binary trees from the set of binary trees, a quantity of the selected plurality of binary trees equaling a quantity of the set of new binary trees, and replace the selected plurality of binary trees with the set of new binary trees to obtain the updated set of binary trees.

5. The system as claimed in claim 3, wherein the at least one processor is configured to create a new collection of data points and recursively partition the new collection of data points into a new set of new binary trees every fixed time interval.

6. The system as claimed in claim 5, wherein the fixed time interval is between 5 and 15 minutes.

7. The system as claimed in claim 3, wherein the at least one processor is configured to:

determine a quantity of the collection of data points which correspond to a new anomaly or correspond to an anomaly detected at most a maximum amount of time ago, determine whether the quantity exceeds a threshold, and generate the output signal reflecting a detected accident if the quantity is determined to exceed the threshold.

8. The system as claimed in claim 1, wherein the at least one processor is configured to select the value for the coordinate randomly on the interval.

9. The system as claimed in claim 1, further comprising the measurement units and wherein the at least one processor is configured to measure the measurement data via the measurement units.

10. A system for detecting accidents in motorsports, the system comprising at least one processor configured to:

obtain, in real-time, measurement data from measurement units incorporated in or attached to a plurality of vehicles, the measurement data comprising a plurality of data points, each of the plurality of data points comprising a value for each of a plurality of variables, recursively partition the plurality of data points into a set of binary trees by determining a plurality of random subsets of the plurality of data points and building a binary tree for each respective subset of the plurality of random subsets, the data points of the respective subset being included as external nodes in a respective binary tree corresponding to the respective subset, each of the binary trees further including internal nodes, each of the internal nodes having a first subtree and a second subtree, wherein each remaining data point of a set of remaining data points of the respective subset is assigned to the first subtree or the second subtree based on which side of a hyperplane the remaining data point lies, the hyperplane being a hyperplane in an N-dimensional representation of the plurality of data points, each of the N dimensions corresponding to one of the plurality of variables, an N-dimensional slope vector of the hyperplane being randomly selected and each coordinate value of an N-dimensional intercept point of the hyperplane being determined by selecting a variable corresponding to a respective coordinate, determining an interval where a distance between values of the variable of consecutive data points of the remaining data points is maximal, and selecting a value for the respective coordinate on the interval, determine an average tree depth of the set of binary trees, determine, for each respective data point of the plurality of data points, a path length between an external node of a binary tree of the set of binary trees and a root node of the binary tree, the external node being associated with the respective data point, determine, for each respective data point, an anomaly score based on the path length determined for the respective data point and further based on the average tree depth, detect, in real-time, based on the anomaly scores, whether any of the plurality of data points corresponds to an anomaly, and generating an output signal reflecting a detected accident based on one or more detected anomalies by transmitting a control signal to one or more vehicles to activate a steering-assist function and/or a brake-assist function in the one or more vehicles to assist one or more drivers of the one or more vehicles to avoid the detected accident.

11. A method of detecting accidents in motorsports, the method comprising:

obtaining measurement data from measurement units incorporated in or attached to a plurality of vehicles in real-time, the measurement data comprising a plurality of data points, each of the plurality of data points comprising a value for each of a plurality of variables;

recursively partitioning the plurality of data points into a set of binary trees by determining a plurality of random subsets of the plurality of data points and building a binary tree for each respective subset of the plurality of random subsets, the data points of the respective subset being included as external nodes in a respective binary tree corresponding to the respective subset, each of the binary trees further including internal nodes, each of the internal nodes having a first subtree and a second subtree, wherein each remaining data point of a set of remaining data points of the respective subset is assigned to the first subtree or the second subtree based on which side of a hyperplane the remaining data point lies, the hyperplane being a hyperplane in an N-dimensional representation of the plurality of data points, each of the N dimensions corresponding to one of the plurality of variables, an N-dimensional slope vector of the hyperplane being randomly selected and each coordinate value of an N-dimensional intercept point of the hyperplane being determined by selecting a variable corresponding to a respective coordinate, determining an interval where a distance between values of the variable of consecutive data points of the remaining data points is maximal, and selecting a value for the respective coordinate on the interval;

determining an average tree depth of the set of binary trees;

determining, for each respective data point of the plurality of data points, a path length between an external node of a binary tree of the set of binary trees and a root node of the binary tree, the external node being associated with the respective data point;

determining, for each respective data point, an anomaly score based on the path length determined for the respective data point and further based on the average tree depth;

detecting, in real-time, based on the anomaly scores, whether any of the plurality of data points corresponds to an anomaly; and generating an output signal reflecting a detected accident based on one or more detected anomalies by transmitting a control signal to one or more vehicles to activate a steering-assist function and/or a brake-assist function in the one or more vehicles to assist the or more drivers of the one or more vehicles to avoid the detected accident.

12. A non-transitory computer readable storage-medium comprising a computer program or suite of computer programs comprising at least one software code portion or a computer program product storing at least one software code portion, the software code portion, when run on a computer system, being configured for performing the method of claim 11.

* * * * *